US009915568B2

(12) United States Patent
Onishi et al.

(10) Patent No.: US 9,915,568 B2
(45) Date of Patent: Mar. 13, 2018

(54) CIRCUIT DEVICE, TEMPERATURE DETECTION DEVICE, ELECTRONIC DEVICE, AND TEMPERATURE DETECTION METHOD

(71) Applicant: SEIKO EPSON CORPORATION, Tokyo (JP)

(72) Inventors: Kota Onishi, Suwa (JP); Tsutae Hinata, Suwa (JP); Yukinari Shibata, Suwa (JP); Chihiro Fukumoto, Suwa (JP); Naoki Nishigaki, Tottori (JP); Koji Kawaguchi, Tottori (JP)

(73) Assignee: SEIKO EPSON CORPORATION, Tokyo (JP)

( * ) Notice: Subject to any disclaimer, the term of this patent is extended or adjusted under 35 U.S.C. 154(b) by 414 days.

(21) Appl. No.: 14/665,253

(22) Filed: Mar. 23, 2015

(65) Prior Publication Data

US 2015/0276499 A1 Oct. 1, 2015

(30) Foreign Application Priority Data

Mar. 28, 2014 (JP) .................................. 2014-067764

(51) Int. Cl.
*G01K 7/14* (2006.01)
*G01J 5/04* (2006.01)

(52) U.S. Cl.
CPC . *G01K 7/14* (2013.01); *G01J 5/04* (2013.01)

(58) Field of Classification Search
None
See application file for complete search history.

(56) References Cited

U.S. PATENT DOCUMENTS

| 6,320,450 B1* | 11/2001 | Lee ............................ G01J 5/14 327/513 |
| 6,565,254 B2* | 5/2003 | Sato .......................... G01J 5/02 136/224 |
| 2004/0252111 A1 | 12/2004 | Cheon et al. |

FOREIGN PATENT DOCUMENTS

| JP | H08-062047 A | 3/1996 |
| JP | 2002-048648 A | 2/2002 |
| JP | 2002-228523 A | 8/2002 |
| JP | 2005-057480 A | 3/2005 |
| JP | 2005-338021 A | 12/2005 |
| JP | 2006-030416 A | 2/2006 |
| JP | 2012-014191 A | 1/2012 |
| JP | 2012-109904 A | 6/2012 |

\* cited by examiner

*Primary Examiner* — An Do
*Assistant Examiner* — Renee I Wilson
(74) *Attorney, Agent, or Firm* — Oliff PLC

(57) ABSTRACT

A circuit device including: a detection circuit (10) that performs A/D conversion of a first detection voltage (VD1) that is detected by using a thermopile (2), and outputs a first detection value (DT1) that is a digital value, and performs A/D conversion of a second detection voltage (VD2) that is detected by using a thermistor (4), and outputs a second detection value (DT2) that is a digital value; and a control unit (50) that obtains a self-temperature by using the second detection value (DT2), obtains a second electromotive voltage that corresponds to the self-temperature by using the self-temperature, obtains a first electromotive voltage that corresponds to an object's temperature by using the first detection value (DT1) and the second electromotive voltage, and obtains the object's temperature by using the first electromotive voltage.

19 Claims, 8 Drawing Sheets

FIG. 5A $$VTP = \frac{(273.15+TP)^4 - (273.15+TTH)^4}{(273.15+70)^4 - (273.15+25)^4} \cdot S \cdot G + VTPOF$$

FIG. 5B $$VTP = \underbrace{\left|\frac{(273.15+TP)^4}{(273.15+70)^4 - (273.15+25)^4} \cdot S \cdot G\right|}_{VTP0} \quad \Rightarrow \quad \boxed{\text{First storage unit (ROM1)}} \quad TP=-31\sim401°C$$

$$-$$

$$\underbrace{\left|\frac{(273.15+TTH)^4}{(273.15+70)^4 - (273.15+25)^4} \cdot S \cdot G\right|}_{VTH} \quad \Rightarrow \quad \boxed{\text{Second storage unit (ROM2)}} \quad TTH=-21\sim106°C$$

$$+$$

$$\underbrace{\boxed{VTPOF}}_{V0}$$

CIRCUIT DEVICE, TEMPERATURE DETECTION DEVICE, ELECTRONIC DEVICE, AND TEMPERATURE DETECTION METHOD

The entire disclosure of Japanese Patent Application No. 2014-067764, filed Mar. 28, 2014, is expressly incorporated by reference herein.

BACKGROUND

1. Technical Field

The present invention relates to a circuit device, a temperature detection device, an electronic device, a temperature detection method, etc.

2. Related Art

In recent years, a temperature detection device using a thermopile is known as a non-contact temperature detection device. This temperature detection device includes a thermopile (infrared sensor) that detects infrared radiation from an object, and a thermistor that is provided near the thermopile and detects the self-temperature (ambient temperature). The thermopile is characterized by generating electromotive force (electromotive voltage) based on the difference between the temperature of the object and the self-temperature. Therefore, the temperature detection device can detect the temperature of the object based on the detection voltage detected by the thermopile and the detection voltage detected by the thermistor. Such a temperature detection device using a thermopile is disclosed in JP-A-2002-228523, for example.

However, recent temperature detection devices using a thermopile perform temperature detection by using only analogue circuitry, and perform temperature correction by adjusting only the gain. For this reason, it has been difficult to perform temperature detection throughout a wide temperature range, or make an adjustment according to the properties of the thermopile.

SUMMARY

An advantage of some aspects of the invention is to provide, for example, a circuit device, a temperature detection device, an electronic device, and a temperature detection method that allow for high-accuracy temperature detection according to the properties of the thermopile.

One aspect of the invention relates to a circuit device including: a detection circuit that performs A/D conversion of a first detection voltage that is detected by using a thermopile, and outputs a first detection value that is a digital value, and performs A/D conversion of a second detection voltage that is detected by using a thermistor, and outputs a second detection value that is a digital value; and a control unit that obtains a self-temperature by using the second detection value, obtains a second electromotive voltage that corresponds to the self-temperature by using the self-temperature, obtains a first electromotive voltage that corresponds to an object's temperature by using the first detection value and the second electromotive voltage, and obtains the object's temperature by using the first electromotive voltage.

According to this aspect of the invention, the circuit device obtains the first detection value that is a digital value corresponding to the first detection voltage detected by the thermopile, and the second detection value that is a digital value corresponding to the second detection voltage detected by the thermistor. The self-temperature is obtained by using the second detection value. The second electromotive voltage is obtained by using the self-temperature. The first electromotive voltage is obtained by using the first detection value and the second electromotive voltage. The object's temperature is obtained by using the first electromotive voltage. With this configuration, the circuit device can obtain the first electromotive voltage and the second electromotive voltage corresponding to the properties of the thermopile by performing digital processing with the use of the first detection value and the second detection value, which are digital values, thereby obtaining the object's temperature. Thus, the aspect of the invention realizes a circuit device that is capable of performing high-accuracy temperature detection according to the properties of the thermopile.

In the aspect of the invention, the circuit device may also include: a first storage unit that stores values of the object's temperature and values of the first electromotive voltage in association with each other; and a second storage unit that stores values of the self-temperature and values of the second electromotive voltage in association with each other. The control unit may obtain the second electromotive voltage by using: the self-temperature obtained by using the second detection value; and the second storage unit. The control unit may obtain the object's temperature by using: the first electromotive voltage obtained by using the first detection value and the second electromotive voltage; and the first storage unit.

With this configuration, the circuit device can obtain the object's temperature by simple operation using the first storage unit and the second storage unit, thereby reducing the processing load on the control unit, for example.

In the aspect of the invention, the control unit may perform conversion of the first detection value according to a property coefficient parameter for the thermopile, and obtain the object's temperature by using: the first electromotive voltage obtained by using the first detection value having undergone the conversion and the second electromotive voltage; and the first storage unit.

With this configuration, the circuit device can obtain the object's temperature by setting a property coefficient parameter that corresponds to the thermopile to be used, and obtain the object's temperature by using the first storage unit and the second storage unit. Thus, the circuit device can realize high-accuracy temperature detection according to the properties of a wide range of thermopiles.

In the aspect of the invention, the control unit may perform conversion of the first detection value according to a property coefficient parameter for the thermopile, and obtain the first electromotive voltage by using: the first detection value having undergone the conversion; and the second electromotive voltage.

With this configuration, the circuit device can realize high-accuracy temperature detection according to the properties of a wide range of thermopiles by setting a property coefficient parameter that corresponds to the thermopile to be used.

In the aspect of the invention, the circuit device may further include a parameter storage unit that stores the property coefficient parameter for the thermopile.

With this configuration, the circuit device can write, into the parameter storage unit, the property coefficient parameter corresponding to the thermopile to be used, thereby realizing temperature detection suitable to the properties of the thermopile. Thus, the circuit device can support a wide range of thermopiles having various properties.

In the aspect of the invention, the property coefficient parameter for the thermopile may be set according to properties of the thermopile and a gain of signal amplification performed by the detection circuit.

This configuration allows for changing the property coefficient parameter for the thermopile according to the properties of the thermopile to be used and the gain of the detection circuit. For example, a different property coefficient parameter can be set to each circuit device product.

In the aspect of the invention, the control unit may perform offset correction with respect to the thermopile and the detection circuit.

With this configuration, even when a variation occurs in the offset voltage of the thermopile and the offset voltage of the detection circuit, the control unit can perform the offset correction and reduce the adverse effect of the variation on the results of the temperature measurement.

In the aspect of the invention, the control unit may perform gain correction with respect to temperature properties.

With this configuration, even when a variation occurs in the gradient or the like of the temperature properties, the control unit can perform the gain correction and reduce the adverse effect of the variation on the results of the temperature measurement.

Another aspect of the invention relates to a temperature detection device including: any of the above-described circuit devices; the thermopile; and the thermistor.

Yet another aspect of the invention relates to an electronic device including any of the above-described circuit devices.

Yet another aspect of the invention relates to a temperature detection method including: obtaining a first detection value by performing A/D conversion of a first detection voltage detected by using a thermopile, the first detection value being a digital value; obtaining a second detection value by performing A/D conversion of a second detection voltage detected by using a thermistor, the second detection value being a digital value; obtaining a self-temperature by using the second detection value; obtaining a second electromotive voltage that corresponds to the self-temperature by using the self-temperature; obtaining a first electromotive voltage that corresponds to an object's temperature by using the first detection value and the second electromotive voltage; and obtaining the object's temperature by using the first electromotive voltage.

BRIEF DESCRIPTION OF THE DRAWINGS

The invention will be described with reference to the accompanying drawings, wherein like numbers reference like elements.

FIG. 5A and FIG. 5B illustrate a temperature detection technique according to an embodiment.

DESCRIPTION OF EXEMPLARY EMBODIMENTS

The following is a detailed description of preferred embodiments of the invention. Note that the embodiments described below are not intended to unduly limit the content of the invention recited in the claims, and all of the configurations described in the embodiments are not necessarily essential as solutions provided by the invention.

1. Circuit Device, Temperature Detection Device

Figure 1:
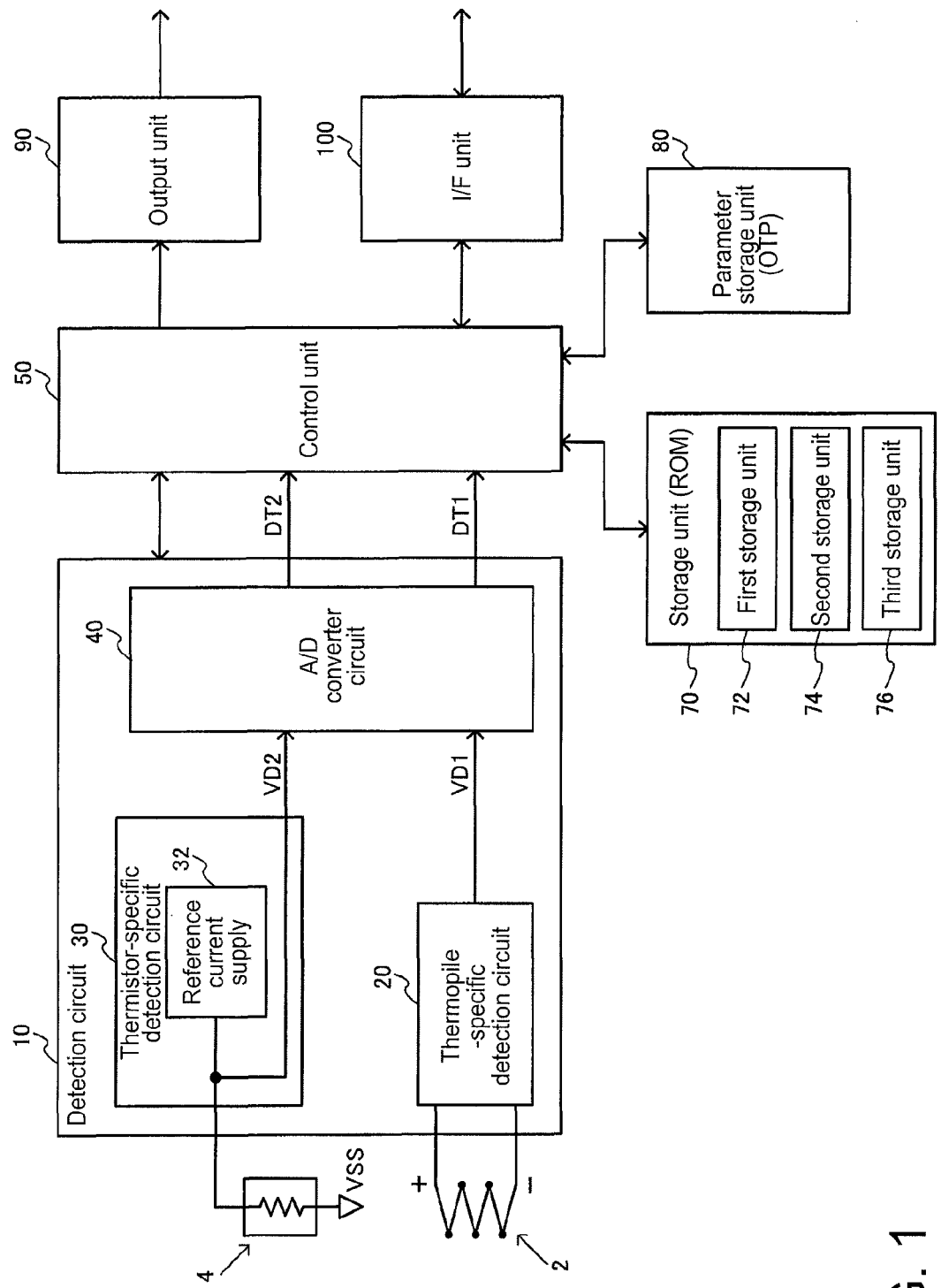
FIG. 1 shows an example of configurations of a circuit device according to an embodiment and a temperature detection device including the circuit device.

FIG. 1 shows an example of the configurations of the circuit device according to an embodiment and a temperature detection device including the circuit device. The circuit device (IC) according to this embodiment includes a detection circuit 10 and a control unit 50. The circuit device may also include a storage unit 70, a parameter storage unit 80, an output unit 90, and an I/F unit 100. The temperature detection device according to this embodiment includes the circuit device, a thermopile 2, and a thermistor 4. The thermopile 2 is, for example, an element (electrical part) that transforms thermal energy into electrical energy. The thermopile 2 can be realized with, for example, a plurality of thermocouples connected in series (or in parallel). The thermistor 4 is, for example, a resistor that widely varies the electrical resistance thereof according to a change in temperature. Note that the circuit device and the temperature detection device according to the embodiment are not limited to the configurations shown in FIG. 1, and various modifications can be carried out, such as omitting some of the constituent elements, and adding other constituent elements.

The detection circuit 10 performs detection processing by using the thermopile 2 and the thermistor 4. For example, one end (on the positive side) and the other end (on the negative side) of the thermopile 2 are electrically connected to the detection circuit 10 via a terminal (such as a pad) of the circuit device. Also, one end of the thermistor 4 is electrically connected to the detection circuit 10 via a terminal (such as a pad) of the circuit device. The other end of the thermistor 4 is connected to a node of a power supply VSS (GND).

The detection circuit 10 performs A/D conversion of a first detection voltage VD1 detected by using the thermopile 2, and outputs a first detection value DT1, which is a digital value. The detection circuit 10 also performs A/D conversion of a second detection voltage VD2 detected by using the thermistor 4, and outputs a second detection value DT2, which is a digital value.

The detection circuit 10 specifically includes a thermopile-specific detection circuit 20, a thermistor-specific detection circuit 30, and an A/D converter circuit 40. The thermopile-specific detection circuit 20 is connected to the one end and the other end of the thermopile 2, and outputs the first detection voltage VD1 to the A/D converter circuit 40. For example, the detection circuit 20 performs amplification of a signal voltage between the two ends of the thermopile 2, and outputs the first detection voltage VD1. Then, the A/D converter circuit 40 performs A/D conversion of the first detection voltage VD1, and outputs the first detection value DT1, which is a digital value.

The thermistor-specific detection circuit 30 includes a reference current supply 32 (reference current generator circuit). The thermistor-specific detection circuit 30 outputs, to the A/D converter circuit 40, the second detection voltage VD2 generated by the reference current flowing through the thermistor 4 from the reference current supply 32. The A/D converter circuit 40 performs A/D conversion of the second detection voltage VD2, and outputs the second detection value DT2, which is a digital value.

The control unit 50 performs various sorts of control processing or various sorts of operation for the circuit device. The control unit 50 can be realized with, for example, a logic circuit such as a gate array circuit, and a processor.

The storage unit 70 includes a first storage unit 72, a second storage unit 74, and a third storage unit 76. The storage unit 70 is realized with, for example, a memory such as a ROM. The parameter storage unit 80 stores various parameters. The parameter storage unit 80 is realized with, for example, a non-volatile electrically-programmable memory such as a one-time programmable ROM (OTP).

The output unit 90 outputs the results of the temperature detection by the control unit 50 to the outside. The I/F (interface) unit 100 performs processing for serving as an interface with an external device. Via the I/F unit 100, external devices (such as a microcomputer and a controller) can set the various parameters or the likes to the circuit device.

Figure 2:
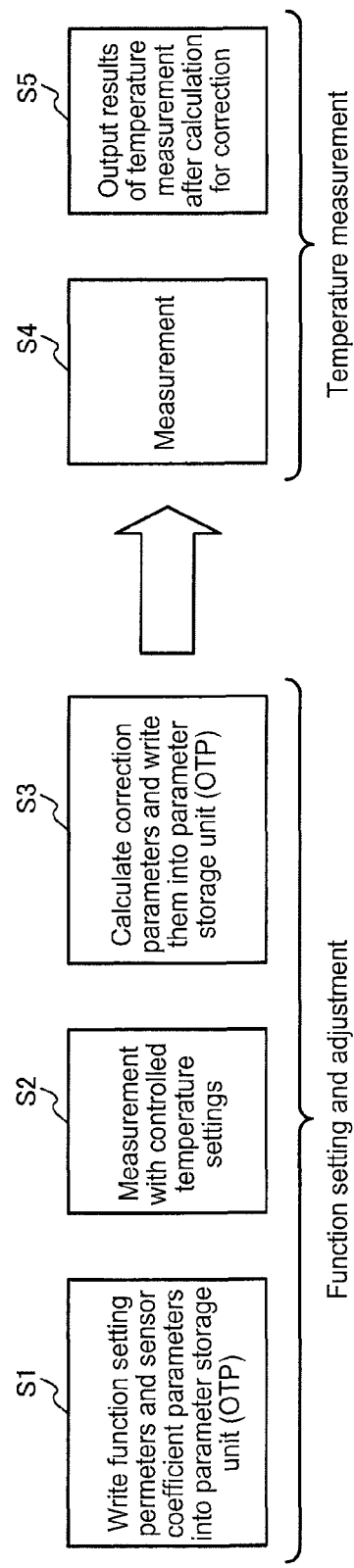
FIG. 2 illustrates general operation of the circuit device according to the embodiment.

FIG. 2 illustrates general operation of the circuit device according to the embodiment. In this embodiment, first, the functions of the circuit device are set and adjusted, and then actual temperature measurement is performed by using the thermopile 2 and the thermistor 4.

The steps of function setting and adjustment shown in FIG. 2 are performed in the stage of, for example, the manufacturing of the circuit device (temperature detection device). Specifically, first, various parameters for the circuit device, such as parameters that determine function settings and sensor coefficients are written into the parameter storage unit 80 (OTP) (Step S1). The function settings are, for example, the settings of the temperature measurement range, the duration of the measurement, and the output format of the results of the temperature measurement. The sensor coefficients are, for example, sensitivity coefficients for the thermopile.

Next, measurement is performed with controlled temperature settings (Step S2). The measurement with controlled temperature settings is, in other words, measurement (temperature detection) performed under the condition where the self-temperature (ambient temperature) and the object's temperature are fixed to particular temperatures. For example, the controlled temperature settings are given so as to set the self-temperature to be 25° C. and the object's temperature to be 70° C. (or, for example, set the self-temperature to be 25° C. and the object's temperature to be 25° C.). Based on the results of the measurement with the controlled temperature settings, correction parameters for temperature measurement are calculated and written into the parameter storage unit 80 (Step S3). The correction parameters are used in the stage of the actual temperature measurement, for the purpose of calculating the object's temperature and the self-temperature from the results of the temperature measurement.

Next, the actual temperature measurement is performed by using the circuit device having undergone the function setting and adjustment (Step S4). Then, the control unit 50 performs correction based on the results (DT1 and DT2) of the detection by the detection circuit 10 and the correction parameters obtained in Step S3, and outputs the results of the temperature measurement, such as the object's temperature and the self-temperature (Step S5).

Figure 3:
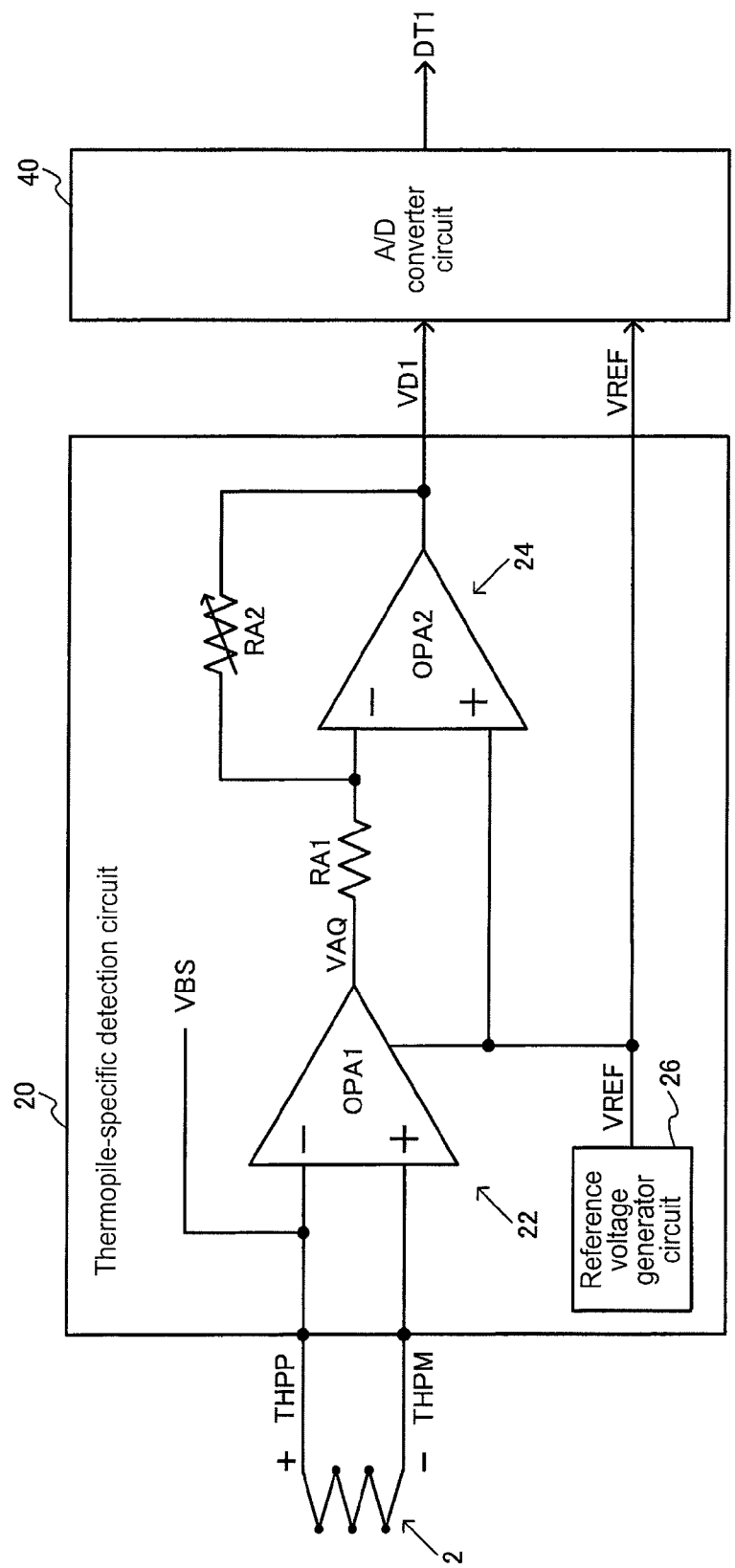
FIG. 3 illustrates a configuration of a thermopile-specific detection circuit.

FIG. 3 illustrates an example of a configuration of the thermopile-specific detection circuit 20. The thermopile-specific detection circuit 20 includes an amplifier circuit 22, a gain adjustment circuit 24, and a reference voltage generator circuit 26. Note that the thermopile-specific detection circuit 20 is not limited to the configuration shown in FIG. 1, and various modifications can be carried out, such as omitting some of the constituent elements, and adding other constituent elements.

The amplifier circuit 22 is made up of, for example, an operational amplifier OPA1 using a switched capacitor circuit. The amplifier circuit 22 (operational amplifier OPA1) has a first input terminal (an inverting input terminal) connected to one end (positive terminal) of the thermopile 2, and a second input terminal (a non-inverting input terminal) connected to the other end (negative terminal) of the thermopile 2. The node of the first input terminal of the amplifier circuit 22 is set at bias voltage VBS. The amplifier circuit 22 is supplied with reference voltage VREF generated by the reference voltage generator circuit 26, where output voltage VAQ from the amplifier circuit 22 is determined relative to the reference voltage VREF.

The amplifier circuit 22 amplifies electromotive voltage VTP=THPP−THPM generated in the thermopile 2. For example, the output voltage VAQ of the amplifier circuit 22 can be expressed by Formula (1) below, where GC denotes the gain of the amplifier circuit 22 (e.g., GC=20):

$$VAQ = -GC \cdot VTP + VREF \quad (1)$$

The gain adjustment circuit 24 (programmable gain amplifier) is made up of an operational amplifier OPA2 and resistors RA1 and RA2. One end of the resistor RA1 is connected to an output terminal of the amplifier circuit 22 (operational amplifier OPA1), and the other end of the resistor RA1 is connected to a first input terminal (inverting input terminal) of the operational amplifier OPA2. One end of the resistor RA2 is connected to the first input terminal of the operational amplifier OPA2, and the other end of the resistor RA2 is connected to an output terminal of the operational amplifier OPA2. The second input terminal (non-inverting input terminal) of the operational amplifier OPA2 is supplied with the reference voltage VREF generated by the reference voltage generator circuit 26. The resistor RA2 is a variable resistor having a variable resistance. The gain of the gain adjustment circuit 24 is set by setting the resistance of the resistor RA2.

According to the gain so set, the gain adjustment circuit 24 amplifies the output voltage VAQ from the amplifier circuit 22, with the reference voltage VREF being the reference, and outputs the first detection voltage VD1. For example, the gain GA of the gain adjustment circuit 24 is GA=R2/R1, where R1 and R2 denote the resistance of the resistor RA1 and the resistance of the resistor RA2, respectively. Accordingly, the first detection voltage VD1, which is the output voltage from the gain adjustment circuit 24, can be expressed by Formula (2) below:

$$VD1 = -(R2/R1) \cdot (VAQ - VREF) + VREF \quad (2)$$
$$= -GA \cdot (VAQ - VREF) + VREF$$

Using Formulas (1) and (2) above, the first detection voltage VD1 can be expressed by Formula (3) below:

$$VD1 = GC \cdot GA \cdot VTP + VREF \quad (3)$$

The A/D converter circuit 40 performs A/D conversion of the first detection voltage VD1. Then, the A/D converter circuit 40 outputs, to the control unit 50, the first detection value DT1 (first voltage data), which is a digital value obtained by A/D conversion of the first detection voltage VD1. Note that the A/D converter circuit 40 performs A/D conversion of the reference voltage VREF as well, and outputs, to the control unit 50, a digital value that corresponds to the reference voltage VREF as well.

Note that although offset voltages of the amplifier circuit 22 (operational amplifier OPA1) and the gain adjustment circuit 24 are not described in detail above, the control unit 50 also performs correction (cancellation) of the offset voltages. Also note that the gain GA of the gain adjustment circuit 24 and the reference voltage VREF can be set to various values via, for example, the I/F unit 100 shown in FIG. 1. Accordingly, the gain GA and the reference voltage VREF can be determined in consideration of the sensitivity, temperature range, accuracy, etc. of the thermopile 2.

Figure 4A:
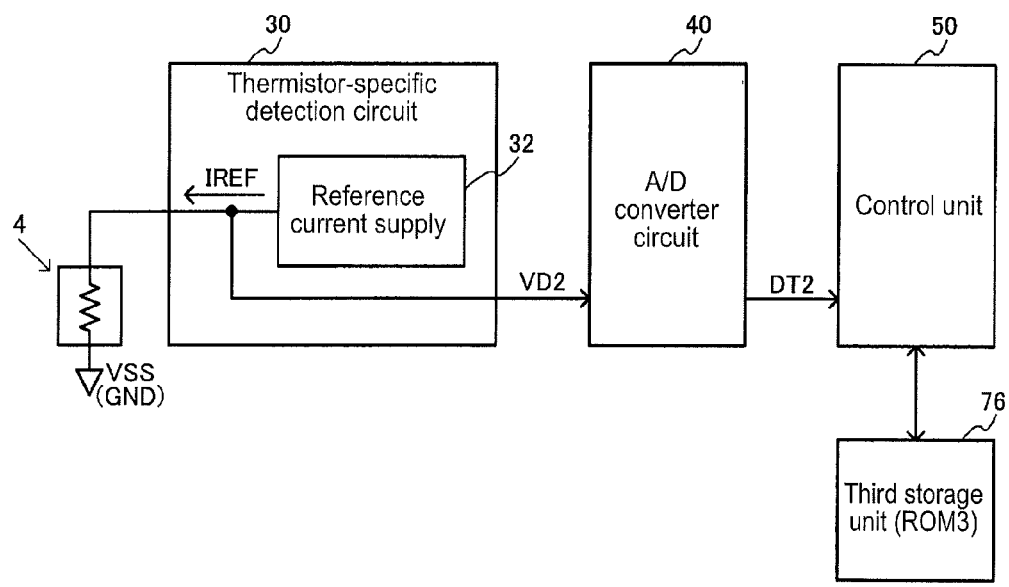
FIG. 4A and FIG. 4B illustrate a configuration of a thermistor-specific detection circuit.
Figure 4B:
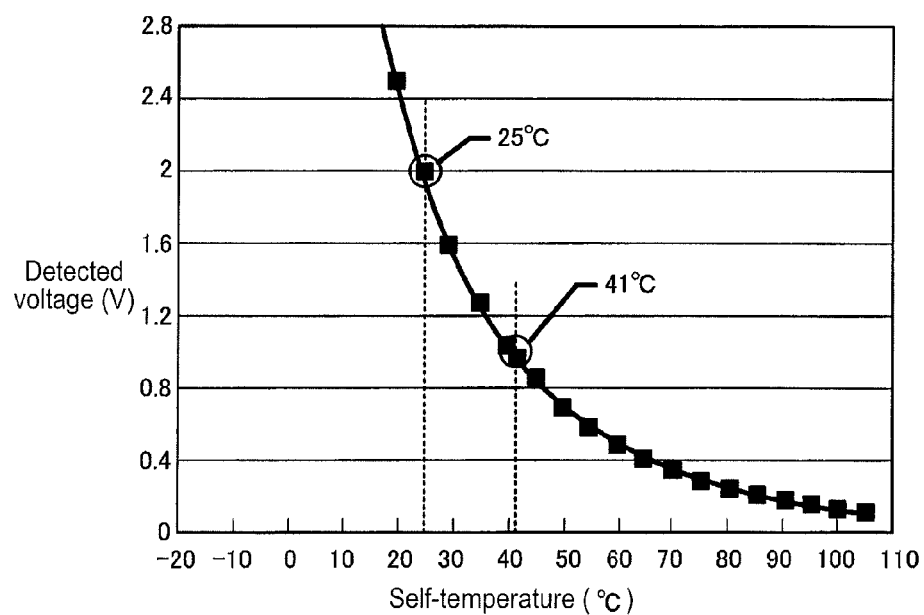

FIG. 4A and FIG. 4B illustrate a configuration of the thermistor-specific detection circuit 30. As shown in FIG. 4A, the thermistor-specific detection circuit 30 includes the reference current supply 32. The voltage generated by the reference current IREF flowing through the thermistor 4 from the reference current supply 32 is output to the A/D converter circuit 40, and serves as the second detection voltage VD2. Then, the A/D converter circuit 40 performs A/D conversion of the second detection voltage VD2, and outputs, to the control unit 50, the second detection value DT2, which is a digital value obtained by A/D conversion of the second detection voltage VD2. The control unit 50 obtains the self-temperature by referring to the third storage unit 76 (ROM3) according to the second detection value DT2. For example, FIG. 4B shows an example of the temperature dependence of the detection voltage detected by the thermistor 4. As shown in FIG. 4B, the self-temperature can be obtained based on the detection voltage detected by the thermistor 4. For example, the third storage unit 76 stores values of the self-temperature and values of second detection value DT2 (VD2) in association with each other. For example, the third storage unit 76 stores a temperature table in which the values of the self-temperature and the values of the second detection value DT2 are associated with each other. Thus, the control unit 50 can obtain the self-temperature by using: the second detection value DT2 received from the A/D converter circuit 40; and the third storage unit 76. For example, the control unit 50 can obtain the self-temperature by searching for the self-temperature that corresponds to the second detection value DT2 throughout the temperature table stored in, for example, the third storage unit 76.

As described above, the circuit device according to the embodiment includes the detection circuit 10 and the control unit 50. The detection circuit 10 performs A/D conversion of the first detection voltage VD1 detected by using the thermopile 2, and outputs the first detection value DT1, which is a digital value. The detection circuit 10 also performs A/D conversion of the second detection voltage VD2 detected by using the thermistor 4, and outputs the second detection value DT2, which is a digital value.

The control unit 50 obtains the self-temperature (TTH described below) by using the second detection value DT2, and obtains a second electromotive voltage (VTH described below) that corresponds to the self-temperature (TTH) by using the self-temperature (TTH). Then, the control unit 50 obtains a first electromotive voltage (VTP0 described below) that corresponds to the object's temperature (TP described below) by using the first detection value DT1 and the second electromotive voltage (VTH), and obtains the object's temperature (TP) by using the first electromotive voltage (VTP0).

The circuit device according to the embodiment specifically includes the first storage unit 72 and the second storage unit 74 as shown in FIG. 1. The first storage unit 72 stores values of the object's temperature (TP) and values of the first electromotive voltage (VTP0) in association with each other. For example, the first storage unit 72 stores a temperature table for determining the first electromotive voltage, in which values of the object's temperature and values of the first electromotive voltage are associated with each other. The second storage unit 74 stores values of the self-temperature (TTH) and the values of the second electromotive voltage (VTH) in association with each other. For example, the second storage unit 74 stores a temperature table for determining the second electromotive voltage, in which values of the object's temperature and values of the second electromotive voltage are associated with each other.

Then, the control unit 50 obtains the second electromotive voltage (VTH) by using: the self-temperature (TTH) obtained based on the second detection value DT2; and the second storage unit 74. For example, the control unit 50 obtains the second electromotive voltage by reading, from the second storage unit 74, the value of the second electromotive voltage associated with the obtained self-temperature. Then, the control unit 50 obtains the object's temperature (TP) by using: the first electromotive voltage (VTP0) obtained based on the first detection value DT1 (VTP) and the second electromotive voltage (VTPH); and the first storage unit 72. For example, the control unit 50 obtains the object's temperature by searching for the value of the object's temperature that corresponds to the first electromotive voltage throughout the temperature table stored in the first storage unit 72.

Note that, as explained for FIG. 4A and FIG. 5B, the self-temperature (TTH) can be obtained by using the second detection value DT2 and the third storage unit 76.

The control unit 50 also performs conversion of the first detection value DT1(VTP), based on a property coefficient parameter (GS described later) that corresponds to the properties of the thermopile 2. Then, the control unit 50 obtains the first electromotive voltage (VTP0) based on the first detection value DT1 having undergone the conversion, and the second electromotive voltage (VTH). Specifically, the control unit 50 obtains the object's temperature (TP) by using: the first detection value DT1 having undergone the conversion based on the property coefficient parameter (GS); and the first storage unit 72.

The parameter storage unit 80 stores the property coefficient parameter (GS) for the thermopile 2. The property coefficient parameter (GS) for the thermopile 2 is determined according to the properties (S) of the thermopile 2 and the gains (GC, GA) of the signal amplification performed in the detection circuit 10. For example, as explained for FIG. 3, the detection circuit 10 (the thermopile-specific detection circuit 20) includes the amplifier circuit 22 and the gain adjustment circuit 24. The property coefficient parameter (GS) for the thermopile 2 is determined according to: the properties (S) of the thermopile 2; the gain GC of the amplifier circuit 22; and the gain GA of the gain adjustment circuit 24, for example. With such a property coefficient parameter (GS) prepared in advance, the object's temperature can be obtained with respect to a wide range of thermopiles 2 having various properties (e.g. various degrees of sensitivity) by using the first storage unit 72.

Figure 7:
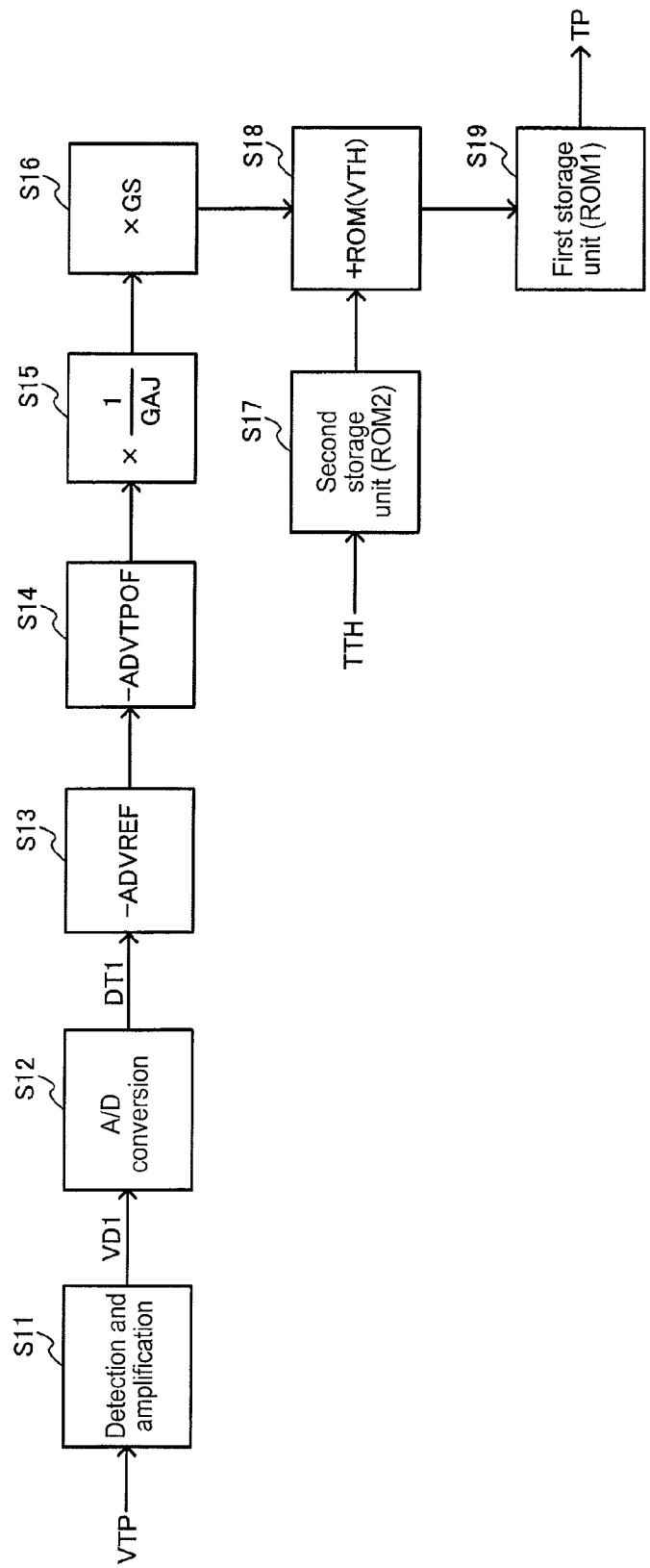
FIG. 7 illustrates details of an example of operation by the temperature detection technique according to the embodiment.

The control unit 50 also performs offset correction for the thermopile 2 and the detection circuit 10. The offset correction for the thermopile 2 is, for example, the processing of cancelling the offset voltage (VTPOF described later) of the thermopile 2. The offset correction for the detection circuit 10 is, for example, the processing of cancelling the offset voltages of the amplifier circuit 22 (the operational amplifier OPA1) and the gain adjustment circuit 24 (the operational amplifier OPA2) shown in FIG. 3. This offset correction is realized by, for example, Step S14 in FIG. 7 described below.

The control unit 50 also performs gain correction (magnification correction) with respect to the temperature properties. This gain correction is correction of the gradient (gain) of the temperature properties, for example. The gain correction is performed for the purpose of correcting a variation in gradient (gain) of the temperature properties with respect to the object's temperature, etc. Such a variation is caused by the occurrence of a variation in property coefficient (related to the sensitivity, etc.) of the thermopile 2, or a variation in circuit constant of the detection circuit 10 (e.g. gain of the operational amplifier). This gain correction is realized by, for example, Step S15 in FIG. 7 described below. For example, the first storage unit 72 and the second storage unit 74 store temperature tables representing the temperature properties illustrated in FIG. 6A and FIG. 6B described below. These temperature tables are obtained based on the formula shown in FIG. 5B. However, the temperature properties of an actual device shows a variation in gradient relative to the temperature properties illustrated in FIG. 6A and FIG. 6B. The gain correction of the temperature properties is performed for correcting such a variation.

2. Temperature Detection Technique According to Embodiment

The following provides a detailed description of the temperature detection technique (temperature detection method) according to an embodiment. In this embodiment, the object's temperature and the self-temperature are detected by the technique described below.

FIG. 5A is an example of a formula (a theoretical formula) for calculating the electromotive voltage VTP (electromotive force) generated by the thermopile 2. TP denotes the object's temperature, TTH denotes the self-temperature (thermistor temperature), and S denotes the property coefficient for the thermopile 2. The property coefficient S (measured in volts) equals to, for example, the electromotive voltage generated by the thermopile 2 under the condition where the self-temperature TTH=25° C. and object's temperature TP=70° C. G denotes a variation coefficient (0.8 to 1.2), and VTPOF denotes the offset voltage of the thermopile 2. G equals to a variation in the gain. VTPOF equals to, for example, the electromotive voltage generated by the thermopile 2 under the condition where the self-temperature TTH equals to the object's temperature TP (e.g. TTH=TP=25° C.). G and VTPOF are factors that may cause variations in properties of the elements of the thermopile 2, and have an influence on the electromotive voltage VTP.

As shown in FIG. 5B, the electromotive voltage VTP can be divided into: the first electromotive voltage VTP0 generated by the thermopile 2 per se; the second electromotive voltage VTH generated due to the self-temperature TTH; and the offset voltage V0 (=VTPOF). The first electromotive voltage VTP0 is the electromotive voltage generated due to the difference between the object's temperature TP and the self-temperature TTH. The second electromotive voltage VTH is the electromotive voltage generated only due to the self-temperature TTH. The offset voltage V0 is the electromotive voltage that is generated even when the difference between the object's temperature TP and the self-temperature TTH is 0.

S shown in FIG. 5B has a different meaning from the property coefficient S in FIG. 5A for the thermopile 2. S shown in FIG. 5B is a ROM coefficient used in the case of storing temperature data into the storage unit 70.

In this embodiment, the result of the calculation of the first electromotive voltage VTP0 under the condition where the ROM coefficient S=472 and G=1.0 for example is stored into the first storage unit 72. The result serves as temperature determination data. Specifically, values of the object's temperature TP and values of the first electromotive voltage VTP0 are stored into the first storage unit 72 in association with each other.

Also, the result of the calculation of the second electromotive voltage VTH under the condition where S=472 and G=1.0 is stored into the second storage unit 74. This result also serves as temperature determination data. Specifically, values of the self-temperature TTH and values of the second electromotive voltage VTH are stored into the second storage unit 74.

Figure 6A:
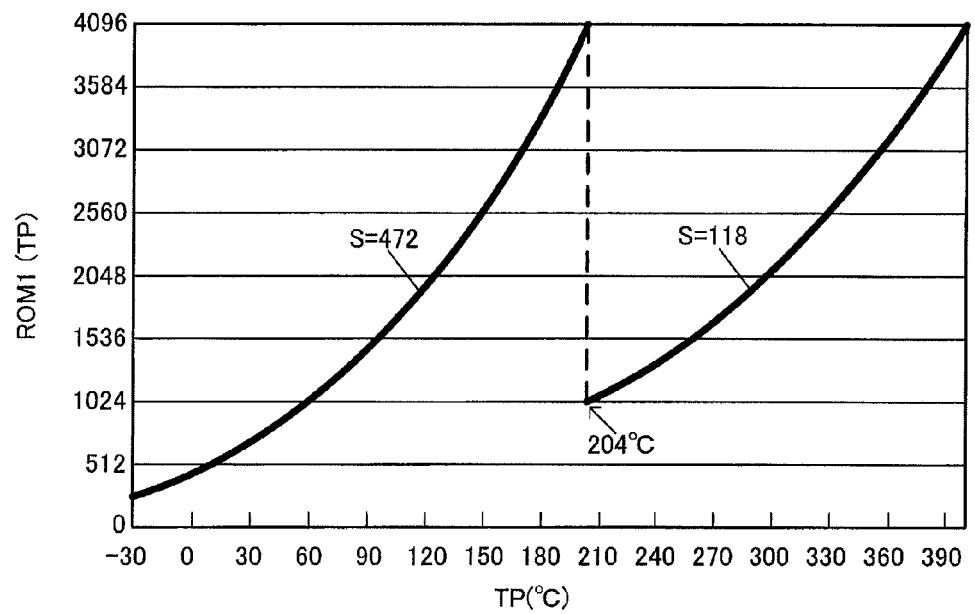
FIG. 6A and FIG. 6B show an example of a temperature table stored in a first storage unit and an example of a temperature table stored in a second storage unit.
Figure 6B:
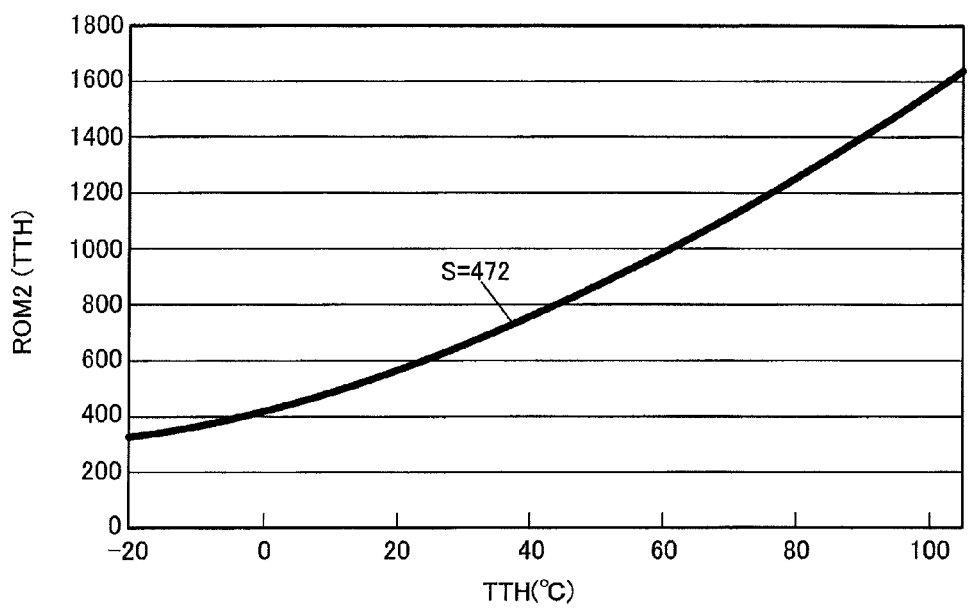

FIG. 6A and FIG. 6B show an example of a temperature table (temperature determination data) stored in the first storage unit 72 and an example of a temperature table (temperature determination data) stored in the second storage unit 74. As shown in FIG. 6A, in the range of $-31°$ C.$\leq$TP$<$204° C. for example, ROM1(TP), which is the value (ROM value) of the first electromotive voltage VTP0 corresponding to the object's temperature TP, is calculated under the condition where ROM coefficient S=472. On the other hand, in the range of 204° C.$\leq$TP$\leq$401° C. for example, ROM1(TP) is calculated under the condition where ROM coefficient S=118. Also, as shown in FIG. 6B, in the range of $-21°$ C.$\leq$TTH$\leq$106° C. for example, ROM2(TTH) is calculated, which is the value (ROM value) of the second electromotive voltage VTH corresponding to the self-temperature TTH.

The number of significant figures available in the first storage unit 72 (and the second storage unit 74) is 12 bits=4096, and accordingly the ROM coefficient S is set to 472 so that ROM1(TP) falls within the range of 12 bits=4096. In this case, when the object's temperature TP is 204° C., ROM1(TP) is 4103, which is above the range of 12 bits=4096. For this reason, in the range of TP$\geq$204, ROM coefficient S is set to 472/4=118. To address the cases where TP$\geq$204, the measurement result that is subject to the temperature determination is multiplied by ¼.

In this embodiment, the temperature detection technique discussed below is adopted, focusing on the fact that the electromotive voltage VTP of the thermopile 2 can be expressed as shown in FIG. 5B.

In this embodiment, as explained for FIG. 1, first, the first detection value DT1 and the second detection value DT2 are obtained by performing A/D conversion of the first detection voltage VD1 and the second detection voltage VD2 detected by using the thermopile 2 and the thermistor 4, respectively. The first detection value DT1 corresponds to the electromotive voltage VTP.

Then, the self-temperature TTH is obtained by using the second detection value DT2. As explained for FIG. 4A and FIG. 4B for example, the self-temperature TTH is obtained by searching the temperature table stored in the third storage unit 76 for the value of the self-temperature TTH that corresponds to the second detection value DT2 obtained by the A/D conversion of the second detection voltage VD2 of the thermistor 4.

Next, the second electromotive voltage VTH that corresponds to the self-temperature TTH is obtained based on the self-temperature TTH so obtained. Specifically, as explained for FIG. 5B, the value of the second electromotive voltage VTH that corresponds to the self-temperature TTH is read from the second storage unit 74, based on the value of the self-temperature TTH. In other words, values of the second electromotive voltage VTH corresponding to the ROM coefficient S=472 are calculated in advance and stored in the second storage unit 74 in association with values of the self-temperature TTH. Then the value of the second electromotive voltage VTH that corresponds to the self-temperature TTH obtained based on the second detection value DT2 is read from the second storage unit 74.

Then, the first electromotive voltage VTP0 that corresponds to the object's temperature TP is obtained based on the first detection value DT1 (VTP) and the second electromotive voltage VTH so obtained. For example, as apparent form the formula shown in FIG. 5B, the value of the first electromotive voltage VTP0 can be obtained by adding the value of the second electromotive voltage VTH to the value of the electromotive voltage VTP that corresponds to the first detection value DT1, and subtracting the value of the offset voltage V0 (VTPOF).

Next, the object's temperature TP is obtained based on the first electromotive voltage VTP0 so obtained. Specifically, the object's temperature TP is obtained by searching for the value of the object's temperature TP that corresponds to the first electromotive voltage VTP0 by using the temperature table stored in the first storage unit 72. In other words, values of the first electromotive voltage VTP0 corresponding to the ROM coefficient S=472 (and 118) are calculated in advance and stored in the first storage unit 72 in association with values of the object's temperature TP. Then, the object's temperature TP is obtained by searching the temperature table stored in the first storage unit 72 for the value of the object's temperature TP that corresponds to the value of the first electromotive voltage VTP0 obtained by using the first detection value DT1 (VTP) and the second electromotive voltage VTH (and the offset voltage V0).

In this way, according to this embodiment, the object's temperature TP and the self-temperature TTH are obtained by using the first detection voltage VD1 detected by the thermopile 2 and the second detection voltage VD2 detected by the thermistor 4. Therefore, the technology according to this embodiment allows for obtaining the object's temperature TP with a low processing load even if the thermopile 2 for the use is selected from a wide range of thermopiles 2 having various property coefficients.

As an example comparative to this embodiment, a technology can be conceived of obtaining the object's temperature TP only by analogue processing performed by analogue circuitry. However, since this comparative example performs temperature correction, etc. by adjusting the gain, it is difficult to perform the adjustment throughout a wide temperature range according to the property coefficient of the thermopile 2.

In contrast, according to this embodiment, the object's temperature TP is obtained by digital processing, specifically by converting the first detection voltage VD1 of the thermopile 2 and the second detection voltage VD2 of the thermistor 4 respectively into the first detection value DT1 and the second detection value DT2, which are digital values. More specifically, the object's temperature TP is obtained by taking the advantage of the fact that the formula of the electromotive voltage VTP can be divided into the term of the first electromotive voltage VTP0, the term of the second electromotive voltage VTH, and the term of the offset voltage V0 as shown in FIG. 5B. Therefore, when compared with the comparative example that obtains the object's temperature TP by analogue processing performed by analogue circuitry, the technology according to the embodiment allows for high-accuracy detection of the object's temperature TP even if the thermopile 2 for the use is selected from a wide range of thermopiles 2 having various property coefficients. According to the technology of the comparative example, when the circuit constant of the analogue circuitry is set according to the thermopile 2 having a particular property coefficient, it is difficult to support another thermopile 2 that has a property coefficient that is different from the aforementioned setting. In contrast, according to the embodiment, the object's temperature TP is obtained by digital processing using the first detection value DT1 and the second detection value DT2. Therefore, the technology according to the embodiment allows for high-accuracy detection of the object's temperature TP by performing correction for supporting a wide range of thermopiles 2 having various property coefficients.

For example, as explained for FIG. 6A and FIG. 6B, values (temperature tables) of the first electromotive voltage VTP0 and the second electromotive voltage VTH shown in FIG. 5B are calculated with the ROM coefficient S being set to a particular value (e.g., S=472, S=118), and stored in the first storage unit 72 and the second storage unit 74. Also, in order to support a wide range of thermopiles 2 having various property coefficients, the property coefficient parameter GS as described below is prepared for the thermopile 2. The property coefficient parameter GS is written into the parameter storage unit 80 (OTP) in the stage of manufacturing the circuit device, for example. In the stage of actual temperature measurement, the conversion of the first detection value DT1 is performed based on the property coefficient parameter GS, and the first electromotive voltage VTP0 is obtained based on the first detection value DT1 having undergone the conversion and the second electromotive voltage VTH. The object's temperature TP is obtained by searching for the value of the object's temperature TP that corresponds to the first electromotive voltage VTP0 by using the temperature table stored in the first storage unit 72.

Thus, even when a thermopile 2 having different property coefficients is used, it is possible to perform high-accuracy detection of the object's temperature TP by setting the property coefficient parameter GS to the value that corresponds to this thermopile 2, and performing correction. Also, the first storage unit 72 and the second storage unit 74 need to store only the calculation results in the case where the ROM coefficient S is a particular value. Therefore, the technology according to the embodiment allows for saving the storage capacities of the first storage unit 72 and the second storage unit 74, and realizes the calculation of the object's temperature TP by digital processing, by using the first storage unit 72 and the second storage unit 74 having a small storage capacity.

According to the embodiment, the storage unit is divided into the first storage unit 72 and the second storage unit 74, where the first storage unit 72 stores the calculation results of the first electromotive voltage VTP0 and the second storage unit 74 stores the calculation results of the second electromotive voltage VTH. Also, the object's temperature TP is obtained by taking the advantage of the fact that the formula of the electromotive voltage VTP can be divided into the term of the first electromotive voltage VTP0 and the term of the second electromotive voltage VTH, as shown in FIG. 5B. Therefore, the technology according to the embodiment simplifies the operation for obtaining the object's temperature TP, and realizes high-accuracy detection of the object's temperature TP while reducing the processing load on the control unit 50.

3. Details of Processing Example

The following provides the details of an example of the operation by the temperature detection technology according to an embodiment.

First, the electromotive voltage VTP generated by the thermopile 2 is detected, and is amplified by the amplifier circuit 22 and the gain adjustment circuit 24 (PGA) of the detection circuit 10 (Step S11). The first detection voltage VD1 after the amplification can be expressed by Formula (4) below:

$$VD1 = VREF + VTP \times GC \times GA \quad (4)$$

Here, GC denotes the gain of the amplifier circuit 22, and GA denotes the gain of the gain adjustment circuit 24.

Next, the first detection voltage VD1 after the amplification is input to the A/D converter circuit 40, and is converted by A/D conversion into the first detection value DT1 that is a digital value (Step S12). The first detection value DT1, which is the result of the A/D conversion, can be expressed by Formula (5) below:

$$DT1 = (VD1/VD28) \times 4096 \quad (5)$$
$$= (VREF + VTP \times GC \times GA)/VD28 \times 4096$$

VD28 denotes the input full scale voltage (the range of the input voltage) of the A/D converter circuit 40. For example, VD28=2.8V. Note that the bias voltage shown in FIG. 3 is set to VBS=VD28/2, for example. The A/D converter circuit 40 is a circuit that performs 12-bit (=4096) A/D conversion, and has a resolution of VD28/4096.

Next, as expressed by Formula (6) below, the portion relating to the reference voltage VREF (i.e., A/D converted value ADVREF that corresponds to VREF) is subtracted from the result of the A/D conversion, namely the first detection value DT1 (Step S13).

$$DT1 - ADVREF = (VREF + VTP \times GC \times GA)/VD28 \times 4096 - \quad (6)$$
$$ADVREF$$
$$= (VTP \times GC \times GA)/VD28 \times 4096$$

As explained for FIG. 5B, VTP can be expressed by Formula (7) shown below.

$$VTP = VTP0 - VTH + V0 \quad (7)$$

Therefore, substitution of Formula (7) above into Formula (6) above leads to Formula (8) below:

$$\{(VTP0 - VTH + V0) \times GC \times GA\}/VD28 \times 4096 \quad (8)$$

Next, subtraction of the portion relating to the offset voltage V0 of the thermopile 2 (i.e., A/D converted value ADVTPOF that corresponds to VTPOF) is performed (Step S14). This is subtraction of ADVTPOF from Formula (8) above.

$$\{(VTP0 - VTH + V0) \times GC \times GA\}/VD28 \times 4096 - ADVT-$$
$$POF = \{(VTP0 - VTH) \times GC \times GA\}/VD28 \times 4096 \quad (9)$$

Note that ADVTPOF to be subtracted may include, in addition to the offset voltage of the thermopile 2, the offset voltages (remaining offset voltages) of the operational amplifiers OPA1 and OPA2 of the thermopile-specific detection circuit 20 shown in FIG. 3, for example.

Next, the gain correction is performed by using gain correction parameter GAJ (Step S15). The gain correction parameter GAJ is used for correcting a variation in gain (variation in the gradient of the temperature properties). The gain of an actual device varies from the design gain. Therefore, as shown in Step 2 in FIG. 2, the actual device is subject to measurement with controlled temperature settings, and the gain correction parameter GAJ is calculated based on the results of the measurement. Then, at the actual temperature measurement of Step S4 shown in FIG. 2, the results of the temperature measurement is corrected by using, for example, the gain correction parameter GAJ as shown in Step S5.

Next, multiplication by the property coefficient parameter GS is performed to determine the temperature by using the temperature determination data (temperature tables) stored in the first storage unit 72 and the second storage unit 74 (Step S16). This means multiplication of Formula (9) above by the property coefficient parameter GS, as shown in Formula (10) below: The value after being multiplied by the property coefficient parameter GS is denoted as ROM (VTP0−VTH). By the multiplication by GS, the value is converted to an appropriate value for the ROM value.

$$\{(VTP0 - VTH) \times GC \times GA\}/VD28 \times 4096 \times GS = ROM$$
$$(VTP0 - VTH) \quad (10)$$

Here, the property coefficient parameter GS can be expressed by Formula (11) below.

$$GS = \{(472/4096) \times VD28)\}/(S \times GC \times GA) \quad (11)$$

The property coefficient parameter GS is a conversion coefficient for transforming the value resulting from the A/D conversion to fit for the temperature table stored in the first storage unit 72, etc. As shown in Formula (11) above, the property coefficient parameter GS is determined according to S, which represents the properties of the thermopile 2, and the gains GC and GA of the signal amplification performed by the detection circuit 10. Specifically, at Step S1 shown in FIG. 2, in the stage of manufacturing, the property coefficient parameter GS, serving as the sensor coefficient, is written into the parameter storage unit 80 (OTP). In this regard, the value of the property coefficient parameter GS to be written is determined according to the circuit constants (GC, GA) of the circuit device, the properties (e.g., sensitivity) of thermopile 2 used by the circuit device, and so on.

Next, the ROM(VTH), which is the value of the second electromotive voltage VTH, is obtained by referring to the second storage unit 74 according to the self-temperature TTH obtained by using the second detection value DT2 detected by the thermistor-specific detection circuit 30 (Step S17). For example, in the temperature table in the second storage unit 74 shown in FIG. 6B, ROM(VTH)=ROM2 (TTH) is satisfied, where ROM2(TTH) denotes the ROM value that corresponds to the self-temperature TTH.

Next, as shown in Formula (12) below, the first electromotive voltage VTP0 of the thermopile 2 per se is obtained by adding ROM(VTH) to ROM(VTP0−VTH), which is the value resulting from the multiplication by the property coefficient parameter GS (Step S18). The value obtained by this addition is denoted as ROM(VTP0).

$$\text{ROM}(VTP0-VTH)+\text{ROM}(VTH)=\text{ROM}(VTP0) \quad (12)$$

Finally, the object's temperature TP is obtained by using ROM(VTP0) obtained by Formula (12) above and the temperature table (temperature determination data) stored in the first storage unit 72 (Step S19). For example, the ROM value corresponding to each object's temperature TP is read one after another by using the temperature table in the first storage unit 72 shown in FIG. 6A. Thus, by comparing the read values of ROM1(TP) with the ROM(VTP0), the temperature that satisfies ROM(VTP0)=ROM1(TP) is obtained as the object's temperature TP. Note that the temperature that corresponds to ROM1(TP) that has the smallest difference from the ROM(VTP0) may be obtained as the object's temperature TP. Alternatively, interpolation may be performed on a plurality of values of ROM1(TP), and the temperature corresponding to the ROM(VTP0) may be obtained as the object's temperature TP.

In the above-described technology according to the embodiment, for example the ROM coefficients S and G shown in FIG. 5B are set to particular values (e.g., S=472, G=1.0), and values of VTP0 and VTH shown in Formula 5B are obtained, and the values of the VTP0 and VTH are stored in advance into the first storage unit 72 and the second storage unit 74 as shown in FIG. 6A and FIG. 6B.

Also, the property coefficient parameter GS={(472/4096)×VD28)}/(S×GC×GA), explained for Formula (11) above, is obtained based on: the gains GC and GA, which are the circuit constants of the circuit device; and the property coefficient S for the thermopile 2 to be used. Then, the property coefficient parameter GS so obtained, which serves as the sensor coefficient parameter, is written into the parameter storage unit 80 (OTP) in the stage of the manufacturing of the circuit device as shown in Step S1 in FIG. 2 for example. Thus, the property coefficient parameter GS that matches the specifications of the circuit device (temperature detection device) to be used is written into the parameter storage unit 80. Accordingly, while saving the storage capacities of the first storage unit 72 and the second storage unit 74, the technology can support a wide range of thermopiles 2 having various properties, thereby supporting the specifications of various products.

Furthermore, the measurement is performed with controlled temperature settings as shown in Step S2 in FIG. 2, and the correction parameters for correcting variations in the properties of the elements are calculated as shown in Step S3. Specifically, the gain correction parameter GAJ shown in Step S15 of FIG. 7, the offset voltage (ADVTPOF) shown in Step S14, etc., are obtained as correction parameters. Variations may occur in: the property coefficient S (related to the sensitivity, etc.) of the thermopile 2; the circuit constants (e.g., gains GC and GA) of the detection circuit 10; and the offset voltages, for example. Therefore, measurement is performed with the controlled temperature settings as shown in Step S2 in FIG. 2, and, according to the results of the measurement, the correction parameters are obtained and written into the parameter storage unit 80(OTP). Then, as shown in Step S5, in the stage of the actual temperature measurement, calculation for correcting the results of the temperature measurement is performed based on the correction parameters stored in the parameter storage unit 80. Consequently, the technology according to the embodiment allows for obtaining high-accuracy temperature measurement results such as the object's temperature TP even when there are variations in the property coefficient S of the thermopile 2, in the circuit constants of the detection circuit 10, or in the offset voltages.

4. Electronic Device

Figure 8:
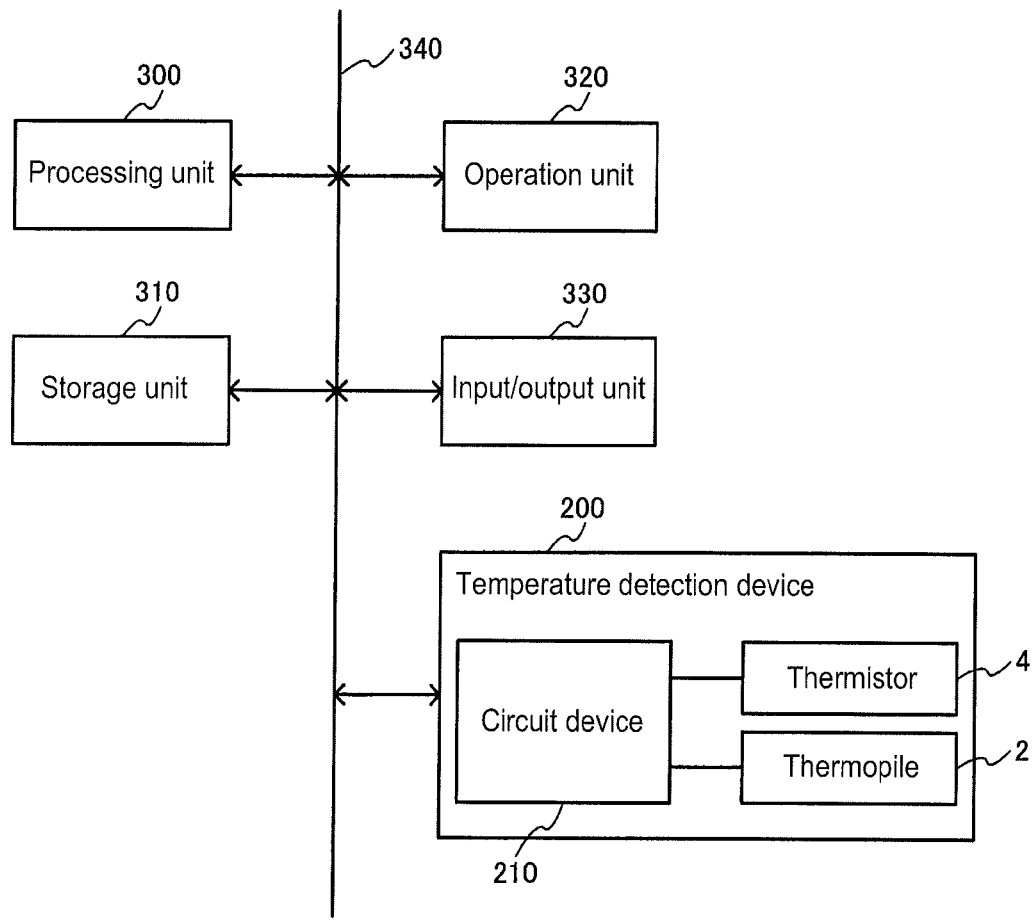
FIG. 8 shows an example of a configuration of an electronic device according to an embodiment.

FIG. 8 shows an example of a configuration of an electronic device including a circuit device 210 and a temperature detection device 200 according to an embodiment. The electronic device includes a processing unit 300, a storage unit 310, an operation unit 320, an input/output unit 330, a bus 340, and a temperature detection device 200. The temperature detection device 200 includes a circuit device 210 according to this embodiment, a thermopile 2, and a thermistor 4. Note that the electronic device according to this embodiment is not limited to the configurations shown in FIG. 8, and various modifications can be carried out, such as omitting some of the constituent elements, and adding other constituent elements. Examples of an electronic device to which the embodiment can be applied vary widely, including air-conditioning facilities such as an air conditioner, induction heating (IH) apparatuses such as an IH stove and an IH rice cooker, fax machines, printing apparatuses, thermometers, human detection sensors, flame detectors, gas detectors, and light meters.

The processing unit 300 performs various sorts of control processing or various sorts of operation for the electronic device, and realized with, for example, a processor such as an MPU, and an ASIC such as a display controller. The processing unit performs various sorts of processing according to the results of temperature measurement such as the object's temperature and the self-temperature detected by the temperature detection device 200.

The storage unit 310 serves as a storage area for the processing unit 300 and so on, and is realized with, for example, a DRAM, a SRAM, or a HDD. The operation unit 320 is used by user inputting various sorts of operational information. The input/output unit 330 exchanges data, etc. with an external device, and is realized with, for example, a wired interface (e.g., USB) or a wireless communication unit.

Note that although the embodiments have been described above in detail, it should be apparent to a person skilled in the art that various modifications that do not stray substantially from the novelty and effects of the invention are possible. Accordingly, these modifications are all intended to be encompassed in the scope of the invention. For example, in the specification and the drawings, terms written together with different terms that are more widely interpreted or have the same meaning in at least one instance can be replaced with those different terms in all cases in the specification or the drawings. Also, the configurations, operations, and the like of the circuit device, the temperature detection device, and the electronic device are not limited to the description given in the embodiments, and can be implemented with various modifications.

What is claimed is:

1. A circuit device comprising:
   a detection circuit that performs A/D conversion of a first detection voltage that is detected by using a thermopile, and outputs a first detection value that is a digital value, and performs A/D conversion of a second detection voltage that is detected by using a thermistor, and outputs a second detection value that is a digital value; and
   a control unit that obtains a self-temperature by using the second detection value, obtains a second electromotive voltage that corresponds to the self-temperature by using the self-temperature, obtains a first electromotive voltage that corresponds to an object's temperature by using the first detection value and the second electromotive voltage, and obtains the object's temperature by using the first electromotive voltage, wherein the control unit:
- performs conversion of the first detection value according to a property coefficient parameter for the thermopile, and
- obtains the first electromotive voltage by using the first detection value having undergone the conversion and the second electromotive voltage.

2. The circuit device according to claim 1 further comprising:
- a first storage unit that stores values of the object's temperature and values of the first electromotive voltage in association with each other; and
- a second storage unit that stores values of the self-temperature and values of the second electromotive voltage in association with each other,
- wherein the control unit
  - obtains the second electromotive voltage by using: the self-temperature obtained by using the second detection value; and the second storage unit, and
  - obtains the object's temperature by using: the first electromotive voltage obtained by using the first detection value and the second electromotive voltage; and the first storage unit.

3. The circuit device according to claim 2,
wherein the control unit performs conversion of the first detection value according to a property coefficient parameter for the thermopile, and obtains the object's temperature by using: the first electromotive voltage obtained by using the first detection value having undergone the conversion and the second electromotive voltage; and the first storage unit.

4. The circuit device according to claim 3 further comprising
a parameter storage unit that stores the property coefficient parameter for the thermopile.

5. A temperature detection device comprising:
the circuit device according to claim 4;
the thermopile; and
the thermistor.

6. The circuit device according to claim 3,
wherein the property coefficient parameter for the thermopile is set according to properties of the thermopile and a gain of signal amplification performed by the detection circuit.

7. A temperature detection device comprising:
the circuit device according to claim 6;
the thermopile; and
the thermistor.

8. A temperature detection device comprising:
the circuit device according to claim 3;
the thermopile; and
the thermistor.

9. An electronic device comprising the circuit device according to claim 3.

10. A temperature detection device comprising:
the circuit device according to claim 2;
the thermopile; and
the thermistor.

11. An electronic device comprising the circuit device according to claim 2.

12. The circuit device according to claim 1,
wherein the control unit performs offset correction with respect to the thermopile and the detection circuit.

13. A temperature detection device comprising:
the circuit device according to claim 12;
the thermopile; and
the thermistor.

14. The circuit device according to claim 1,
wherein the control unit performs gain correction with respect to temperature properties.

15. A temperature detection device comprising:
the circuit device according to claim 14;
the thermopile; and
the thermistor.

16. A temperature detection device comprising:
the circuit device according to claim 1;
the thermopile; and
the thermistor.

17. An electronic device comprising the circuit device according to claim 1.

18. A temperature detection device comprising:
the circuit device according to claim 1;
the thermopile; and
the thermistor.

19. A temperature detection method comprising:
obtaining a first detection value by performing A/D conversion of a first detection voltage detected by using a thermopile, the first detection value being a digital value;
obtaining a second detection value by performing A/D conversion of a second detection voltage detected by using a thermistor, the second detection value being a digital value;
obtaining a self-temperature by using the second detection value;
obtaining a second electromotive voltage that corresponds to the self-temperature by using the self-temperature;
obtaining a first electromotive voltage that corresponds to an object's temperature by using the first detection value and the second electromotive voltage;
obtaining the object's temperature by using the first electromotive voltage,
performing conversion of the first detection value according to a property coefficient parameter for the thermopile, and
obtaining the first electromotive voltage by using the first detection value having undergone the conversion and the second electromotive voltage.

* * * * *